March 18, 1969    M. BOUCRAUT ET AL    3,433,624
TREATMENT OF PULVERULENT MATERIALS
Original Filed May 18, 1965
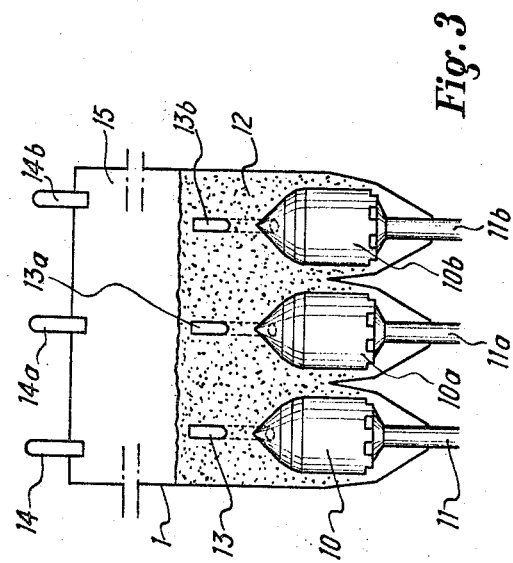
*Fig. 3*
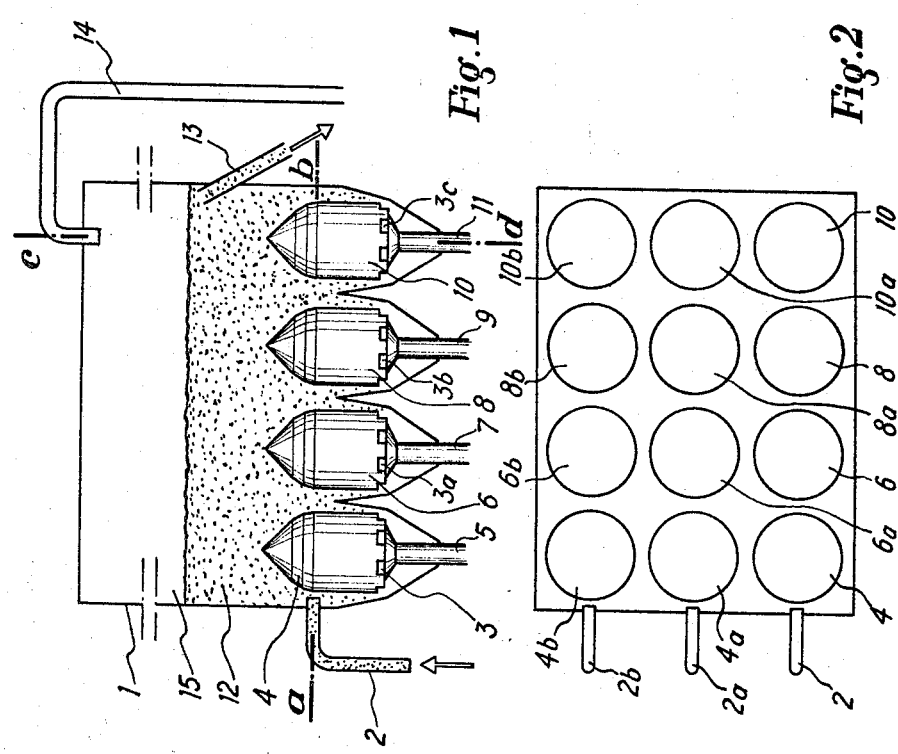
*Fig. 1*
*Fig. 2*
Inventors
Michel Boucraut
Imre Toth
by Michael J. Striker
Atty

United States Patent Office 3,433,624
Patented Mar. 18, 1969

3,433,624
TREATMENT OF PULVERULENT MATERIALS
Michel Boucraut, Metz, Moselle, and Imre Toth, Hy-Metz, Moselle, France, assignors to Institut de Recherches de la Siderurgie Francais, Saint-Germain-en-Laye, Yvelines, France
Continuation of application Ser. No. 456,689, May 18, 1965. This application Mar. 11, 1968, Ser. No. 712,303
Claims priority, application France, Dec. 17, 1964, 999,050
U.S. Cl. 75—1    9 Claims
Int. Cl. C22b 1/10; C21b 1/02

ABSTRACT OF THE DISCLOSURE

Pulverulent materials are fluidized and subjected to heat treatment by passing the material in an even flow along a predetermined path through an enclosed space forming a single fluidizing bed while introducing the treating gases into the enclosed space at a plurality of sets of inlets spaced along said path, the gases emanating from said sets of inlets having from set to set differing physical and chemical characteristics.

An example is the roasting and fluidizing of iron ore wherein the preheated ore is passed along the path forming the fluidizing bed and a neutral gas is supplied to the first stage, an oxidizing gas is supplied at a second stage and a relatively slightly reducing gas is supplied at a third stage and a relatively strongly reducing gas is supplied at a fourth stage of the travel of the ore along said path. Each stage may comprise a plurality of inlets for a combustion gas obtained from a fuel and varying amounts of preheated air.

---

This application is a continuation of application Ser. No. 456,689, filed May 18, 1965, now abandoned.

The present invention relates to a process for treatment of pulverulent materials and, more particularly, to a process wherein fluidization of these materials is effected by gas currents.

It is an object of the present invention to improve treatment of pulverulent materials in the presence of gas and, more particularly, to improve the heat balance of such treatment.

A more specific object resides in a fluidization process which permits the elimination of parasitic components such as water, both in its molecular form and in the form of hydrates, and carbon dioxide.

A still more specific object of the invention is to provide means in connection with a fluidization process either for dehydration with the help of a neutral gas and at comparatively low temperatures or for decarbonation with the help of an oxidizing gas at a much higher temperature.

Under a more general aspect, the invention is directed to a fluidization process which permits an effective control of a cycle of thermal conditions and of a cycle of specific gaseous atmospheres in order to obtain a very high yield and thus an improved heat balance.

These and other objects, as they will appear from the following description, are accomplished broadly by fluidizing pulverulent materials in one and the same bed formed in an enclosed space by means of a plurality of gas currents in which the different gases have different physical and chemical characteristics.

Specific features of the invention are the following:
(a) At least one of the gases of a given composition is introduced into the enclosed reaction space by a plurality of different inlets.
(b) The gas, or the several gases, are obtained by a combination of a combustion supporting agent and a combustible material.
(c) The introduction of the several gases into said enclosed space is individually controlled.
(d) The different gases have different temperatures.

The process of the invention is of particular significance for those pulverulent materials for which the chemical composition and the temperature of the fluidization gas plays an important part. Thus, if there are employed oxidation reactions followed by reduction reactions, the compositions and temperatures of the fluidization gases are critical.

As already pointed out, the process of the invention permits to get rid of waste materials, such as water and carbon dioxide, and also enables both dehydration and decarbonation, depending on whether a neutral gas and a lower temperature or an oxidizing gas and a higher temperature are used. Neutral gas in this connection means a gas which has neither an oxidizing nor a reducing effect in respect of the particular pulverulent fluidized material.

The following is a more specific example of the invention which, however, should not be understood as a limitation in any manner of the general concept disclosed. The example will be described with reference to the attached drawings, in which:

FIG. 1 is a diagrammatic showing of a reactor for a magnetic roasting process as employed in the present invention;

FIG. 2 is a plan view, also in diagrammatical form, of the reactor shown in FIG. 1 along lines a–b, and FIG. 3 represents a vertical section in diagrammatic manner along lines c–d.

The reference number 1 generally refers to a reactor for the magnetic roasting of French Lorraine-type iron ore which is introduced in pulverulent form into the reactor through conduits 2, 2a and 2b. The ore which has previously been heated in an apparatus, not shown, to 250° C. is fluidized through the combustion gases which emanate from the slots 3 of three burners 4, 4a and 4b. The burners are fed in conventional manner with preheated air and heavy fuel by conduits such as indicated at 5. The combustion in burners 4, 4a and 4b takes place in stoichiometric proportions and in a manner that the gases which fluidize the ore at its entry into the reactor are neutral, that is, neither oxidizing nor reducing.

While the introduction of fresh ore through conduits 2, 2a and 2b continues, the ore which has been subject to fluidization by the gases of the burners 4, 4a and 4b is progressively moved on to a place above and around the burners 6, 6a and 6b which are also fed in conventional manner with preheated air and heavy fuel through conduits indicated at 7. The combustion in burners 6, 6a and 6b takes place with an excess of air so that the gases which flow out of slots 3a are oxidizing gases.

The movement of the ore particles in the bed continues, and the particles thus reach the zone of burners 8, 8a and 8b, which again are fed in conventional manner with preheated air and heavy fuel through conduits as shown at 9. The combustion in burners 8, 8a and 8b takes place with a slight deficit of air so that the combustion is incomplete and the combustion gas entering through slot 3b is of a reducing nature.

The particles finally arrive at the area of burners 10, 10a and 10b, which are likewise supplied with preheated air and heavy fuel through conduits 11, 11a and 11b. The combustion in these burners is effected with a substantial deficiency of air, so that the gases originating from burners 10, 10a and 10b through slots 3c are strong reducing agents without, however, causing carbon black particles to form.

The treated ore is removed from the single fluidization bed 12 through conduits 13, 13a and 13b, and is led to an exchanger of conventional type wherein it will give off a substantial portion of its sensible heat, which heat then is used to preheat the fresh ore entering through conduit 2 to a temperature of 250° C. The gases are blown out through conduits 14, 14a and 14b, which have their inner inlets in the upper portion 15 of the enclosed space 1, which portion may be designated as the return level.

The following examples illustrate the application of the invention without any intention of limitation. Thirty tons per hour of crude and dry Lorraine-type ore of the composition shown in Table I were treated

TABLE I

| Mineral Components | Weight, percent | Contents of Individual Components | | | | | | |
|---|---|---|---|---|---|---|---|---|
| | | Fe | SiO$_2$ | CaO | Al$_2$O$_3$ | CO$_2$ | H$_2$O | F$_2^{++}$ |
| Limonite | 57 | 29.6 | 2.2 | 0.1 | 3.6 | | 6.6 | 2.3 |
| Calcite | 21 | | | 11.5 | | 9.5 | | |
| Clays | 14 | 2.7 | 5.6 | | 2.3 | | 1.4 | 2.3 |
| Siderite | 4 | 1.5 | | 0.2 | | 1.6 | | 1.5 |
| Chlorite | 3 | 0.9 | 0.8 | | 0.3 | | 0.3 | 0.8 |
| Quartz | 1 | | 1.0 | | | | | |
| Total | 100 | 34.7 | 9.6 | 11.8 | 6.2 | 11.1 | 8.3 | 6.9 |

In order to establish an overall heat balance heat balances were set up for the individual stages. On the basis that the reactor 1 occupied a space of 12 m.$^2$ (3 x 4 m.) and that each burner served a portion of the fluidization bed having a cross-sectional area above the burner of 1 m.$^2$, individual heat balances for the different stages were established as follows:

(1) In the zone of burners 4, 4a and 4b the fluidization gases originating from the burners were neutral. Their function was to dehydrate the ore, that is, to remove therefrom molecules of constituent water as distinguished from the accidental humidity which had already been eliminated during the preheating of the ore.

The gases which originate from each burner on this level accordingly must dehydrate 30 t./3=10 t./hour of ore, that is, 830 kg./h. of water or 1030 Nm.$^3$/h. of water vapor which corresponds to a thermic requirement of 740 therms/h. (one "therm," abbreviated "th.," equalling one million small calories and "mth." standing for "millitherm"). For this purpose there were used up 80 kg./h. of heavy fuel which was preheated at 250° C. and combined with air, the latter being preheated to 300° C. The gas balance of each of the burners 4, 4a and 4b was, therefore, as shown in the following Table II.

TABLE II

| | CO$_2$, Nm.$^3$/h. | H$_2$O, Nm.$^3$/h. | N$_2$, Nm.$^3$/h. | Total, Nm.$^3$/h. |
|---|---|---|---|---|
| Combustion gases from 80 kg./h. fuel | 140 | 112 | 740 | 992 |
| Dehydration | | 1,033 | | 1,033 |
| Total in Nm.$^3$/h. | 140 | 1,145 | 740 | 2,025 |

The figures given above permit calculation, for the zone fed by each of the burners 4, 4a and 4b, of the heat balance, shown in Table III, if the average temperature of the particles in the bed was about 250° C., the specific heat of the ore was 0.2 mth./kg./° C. at 250 to 300° C., and the heat generating power of the heavy fuel was 10 therms/kg.

The outflow of gas in this zone was 2025 Nm.$^3$/h. or $$2025 \frac{273+250}{273} = 3880 \text{ m.}^3/\text{h. or } 1.077 \text{ m.}^3/\text{sec.}$$

assuming that atmospheric pressure prevailed in the enclosed space. The velocity of the gas when there were no particles in the fluidization bed was 1.08 m./sec.

This velocity is sufficiently weak to avoid the entrainment of the particles. However, after the ore has been treated by the gas, the gas was then blown towards the upper portion of the reactor, the so-called return level where it no longer contained fluidized particles.

(2) A heat balance was established also for each of burners 6, 6a and 6b. The gases originating from each of the burners in this zone were oxidizing gases, which permits to raise the heat level of the particles on an average to 525° C., which is the temperature required to decompose the carbonates and, in particular, the siderite. The oxidizing gases also converted all iron oxides into sesquioxide (Fe$_2$O$_3$).

The chemical and mineralogical composition indicates that there were 160 kg./h. of CO$_2$ attached to the iron of the siderite per ten tons of ore treated each hour. By decarbonization at about 500° C. this was equivalent to a weight loss of 160 kg./h., that is, an input of 80 Nm.$^3$/h. of CO$_2$ in the gas. This composition also indicated that the siderite in its crystalline network contained a very small portion of CaCO$_3$ (CaO=0.2), which was closely attached to the FeCO$_3$ and which was also decomposed around 500° C.

The decomposition reactions accordingly are the following:

$$FeCO_3 \rightarrow FeO + CO_2 + 21 \text{ mth.}$$

$$CaCO_3 \rightarrow CaO + CO_2 + 42.5 \text{ mth.}$$

The endothermic reactions resulted therefore in the following heat requirements:

$$\frac{150 \text{ kg./h.}}{56} \times 21 + \frac{20 \text{ kg./h.}}{56} \times 42.5 = 70 \text{ th./h.}$$

The oxidation of all ferrous iron to the Fe$_2$O$_3$ stage proceeded according to the following exothermic reaction:

$$2FeO + \tfrac{1}{2}O_2 \rightarrow Fe_2O_3 - 69 \text{ mth.}$$

Since it is necessary to oxidize 690 kg./h. of Fe$^{++}$ this corresponds to a weight increase of 100 kg./h. This then involved a requirement of oxygen in the gases in the amount of 70 Nm.$^3$/h., that is, an excess of air of 330

TABLE III

| Input and Inflow | | | | Requirements and Outflow | | | | |
|---|---|---|---|---|---|---|---|---|
| Combustion of 80 kg./h. fuel | | | 800 th./h. | Dehydration | | | | 740 th./h. |
| Available heat of 10 t./h. ore introduced at 250° C.: 10×0.2×(250−25) | | | 450 th./h. | Available heat of the ore: 9.17×0.2×(250−25) | | | | 413 th./h. |
| Available heat of the air preheated to 300° C.: | | | | Available heat of the gases: | | | | |
| | O$_2$ | N$_2$ | | | CO$_2$ | H$_2$O | N$_2$ | |
| Nm.$^3$/h. | 196 | 740 | | Nm.$^3$/h. | 140 | 1.145 | 740 | |
| Mth./Nm.$^3$ | 89.66 | 86.38 | 82 th./h. | Mth./Nm.$^3$ | 100.40 | 82.44 | 70.31→ | 160 th./h. |
| | | | | Losses and sundry | | | | 19 th./h. |
| | | | 1,332 th./h. | | | | | 1,332 th./h. |

Nm.³/h. was necessary. This oxidation reaction thus leads to a thermic input of $$\frac{69 \text{ th.} \times 690}{56 \times 2} = 425 \text{ th./h.}$$

Altogether there occurred in this zone a weight loss in ore equivalent to 160—100=60 kg./h. and a thermal input of 425—70=355 th./h. The heat complement was supplied by 30 kg./h. of heavy fuel, of which the combustion with an excess of air resulted in the gas balance of Table IV which shows that there was added an input of 80 Nm.³/h. of CO₂ originating from the decomposition of the carbonates.

TABLE IV

|  | CO₂ in Nm.³/h. | H₂O in Nm.³/h. | N₂ in Nm.³/h. | Total in Nm.³/h. |
|---|---|---|---|---|
| Combustion gases from 30 kg./h. of fuel | 52 | 42 | 280 | 374 |
| N₂ derived from excess of air | | | 260 | 260 |
| CO₂ of decarbonation | 80 | | | 80 |
| Total in Nm.³/h. | 132 | 42 | 540 | 714 |

The heat balance in the zone of each of the burners 6, 6a and 6b was therefore as shown in Table V, assuming that the average temperature of the bed in this zone was 525° C., and that the specific heat of the ore was 0.21/mth./kg./° C.

|  | Nm.³/h. |
|---|---|
| CO₂ | 34 |
| CO | 70 |
| H₂O | 28 |
| H₂ | 56 |
| N₂ | 315 |
| Total | 503 | that is, 126 Nm.³/h. of CO+H₂ were available for partial reduction.

The complete combustion of 60 kg./h. of heavy preheated fuel oil would have resulted in a thermic input of 600 th./h. Since the combustion, however, was incomplete, there could be deducted the deficiency in therms caused by the presence in the gas of 70 Nm.³ of CO and 56 Nm.³ of hydrogen. On the basis of these amounts the following theoretical reactions, however, did not materialize $$CO + \tfrac{1}{2}O_2 \rightarrow CO_2 - 67.6 \text{ mth.}$$
$$H_2 + \tfrac{1}{2}O_2 \rightarrow H_2O - 57.7 \text{ mth.}$$

The partial combustion of 60 kg./h. of fuel oil instead supplied only $$600 \text{ th.} - 67.6 \times \frac{70}{22.4} - 57.7 \times \frac{56}{22.4} = 244.5 \text{ th./h}$$

TABLE V

| Input and Inflow | | | Requirements and Outflow | | | | |
|---|---|---|---|---|---|---|---|
| Combustion of 30 kg./h. fuel | | 300 th./h. | Available heat of the ore: 9.11×0.21×(525−25) | | | | 957 th./h. |
| Decarbonation and oxidation | | 355 th./h. | Available heat of the gases: | | | | |
| Available heat of the ore | | 413 th./h. | | | | | |
| Available heat of the air preheated to 300° C.: | | | | CO₂ | H₂O | N₂ | |
| | O₂ | N₂ | Nm.³/h | 132 | 42 | 540 | |
| Nm.³/h | 143 | 540 | Mth./Nm.³ | 244.15 | 191.38 | 159.92 | 127 th./h. |
| Mth./Nm.³ | 89.66 | 86.38→ 59 th./h. | Losses and sundry | | | | 43 th./h. |
| | | 1,127 th./h. | | | | | 1,127 th./h. |

The velocity of the gases when there were no particles in this part of the bed was $$714 \text{ m.}^3/\text{h.} \times \frac{525 + 273}{273} \times \frac{1}{3600 \text{ sec.}} \times \frac{1}{1 \text{ m.}^2} = 0.58 \text{ m./sec.}$$

which velocity was entirely adequate to maintain the particles in fluidization.

(3) Regarding the heat balance applying to the zone of each of burners 8, 8a and 8b it is noted that in this part of the bed each burner operated in a reducing atmosphere so as to assure the partial reduction of the ore to magnetite. The reduction reactions are as follows:

$$3Fe_2O_3 + CO \rightarrow 2Fe_3O_4 + CO_2 - 12.1 \text{ mth.}$$
$$3Fe_2O_3 + H_2 \rightarrow 2Fe_3O_4 + H_2O + 2.2 \text{ mth.}$$

The reduction of Fe₂O₃ therefore required an amount of 22,400/56×6=67 liters of reducing gas (CO or H₂) per kg. of iron, that is, 67×3470=232,000 l. or 232 Nm.³/h. of CO+H₂ for 10 t./h. of ore. The amount of fuel oil consumed in each of the burners 8, 8a and 8b was 60 kg./h. The gases originating from each burner at 800° C. had the following composition:

Oxidation of 126 Nm.³/h. of CO+H₂ by part of the oxygen bonded to the iron amounted to a weight loss of the ore in the form of oxygen amounting to $$126 \times \frac{16}{22.4} = 90 \text{ kg./h.}$$

and a heat input amounting to

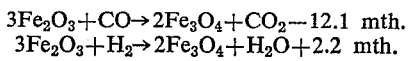

The heat balance in the zone of the bed above and around each burner 8, 8a and 8b was thus as shown in the following Table VI, if the temperature in the bed was 600° C., and the specific heat of the ore at 600 to 650° C. had the value of 0.22 mth./kg./° C.

TABLE VI

| Input and Inflow | | | Requirements and Outflow | | | | |
|---|---|---|---|---|---|---|---|
| Incomplete combustion of 60 kg./h. fuel | | 244 th./h. | Available heat of the ore: (9.11−0.09)×0.22×(600−25) | | | | 1,141 th./h. |
| Heat of reaction | | 33 th./h. | Available heat of the gases: | | | | |
| Available heat of the ore | | 957 th./h. | | | | | |
| Available heat of the preheated air: | | | | CO₂ | H₂O | N₂ | |
| | O₂ | N₂ | Nm.³/h | 104 | 84 | 315 | |
| Nm.³/h | 83 | 315 | Mth./Nm.³ | 285.90 | 222.68 | 185.85 | → 107 th./h. |
| Mth./Nm.³ | 89.66 | 86.38 | Losses and sundry | | | | 21 th./h. |
| | | 35 th./h. | | | | | |
| | | 1,269 th./h. | | | | | 1,269 th./h. |

The total outflow of gas in this zone of the bed was 503 Nm.³/h. at 600° C., that is, a velocity in vacuo of $$503 \text{ m.}^3/\text{h.} \times \frac{600 + 273}{273} \times \frac{1}{3600 \text{ sec.}} \times \frac{1}{1 \text{ m.}^2} = 0.45 \text{ m./sec.}$$

(4) In respect of the heat balance in the zone of each of the burners 10, 10a and 10b the following applies.

The gases originating from each of the burners 10, 10a and 10b should assure the complete reduction of the ore to magnetite. The gases, therefore, must be strong reducing agents in order that the gases flowing out of the fluidization bed, after reduction of the $Fe_2O_3$ remaining in the magnetite, still contain 4 to 5% of $CO+H_2$ at the return level. Their temperature reached 800° C. at the burner outlets. A portion of their available heat however, was passed on to the ore so that at the exit of the fluidization bed the gas temperature was down to 650 to 700° C.

As stated, in the preceding zone there were produced 126 Nm.³/h. of reducing gas as against the required 232 Nm.³/h. It was therefore necessary to provide for an input of 106 Nm.³/h. of $CO+H_2$ in order to reduce all of the sesquioxide of iron to magnetite. The removal of oxygen resulted in a weight reduction of the ore amounting to $$\frac{16 \text{ kg.} \times 106}{22.4} = 76 \text{ kg./h.}$$

Using fuel oil in the amount of 60 kg./h. the gas balance in the zone pertaining to each of the burners 10, 10a and 10b appears from the following Table VII.

TABLE VII

| | $CO_2$ in Nm.³/h. | CO in Nm.³/h. | $H_2O$ in Nm.³/h. | $H_2$ in Nm.³/h. | $N_2$ in Nm.³/h. | Total in Nm.³/h. |
|---|---|---|---|---|---|---|
| Gases at burner outlet at the temperature of 800° C | 34 | 70 | 28 | 56 | 315 | 503 |
| Gases at outlet of the fluidization bed at 650–700° C | 94 | 10 | 74 | 10 | 315 | 503 |

As appears, the gases at the exit of the fluidization bed, that is, at the entry to the return level, still contain 4% of reducing gas ($CO+H_2$) which is in accord with the equilibrium between the gas and the water at 650 to 700° C., since $$\frac{CO}{CO+CO_2} = 0.096$$

and $$\frac{H_2}{H_2+H_2O} = 0.12$$

Reduction was effected by 60 Nm.³/h. of CO and 46 Nm.³/h. of hydrogen, that is, with heat of reaction input as follows:

$$12.1 \times \frac{60}{22.4} - 2.2 \times \frac{46}{22.4} = 28 \text{ th./h.}$$

The heat balance of the zone of each of the burners 10, 10a and 10b at an average temperature of the fluidization bed of 700° C. was as shown in Table VIII.

TABLE VIII

| Input and Inflow | | Requirements and Outflow | | | | | | |
|---|---|---|---|---|---|---|---|---|
| Incomplete combustion of 60 kg./h. heavy fuel oil | 244 th./h. | Available heat of the ore: (9.020−0.076)×0.22×(700−25) | | | | | | 1,328 th./h. |
| Heat of reaction | 28 th./h. | Available heat of the gases: | | | | | | |
| Available heat of the ore | 1,141 th./h. | | $CO_2$ | CO | $H_2O$ | $H_2$ | $N_2$ | |
| Available heat of the preheated air | 35 th./h. | | | | | | | |
| | 1,448 th./h. | Nm.³/h | 94 | 10 | 74 | 10 | 315 | |
| | | Mth./Nm.³ | 343.40 | 222.10 | 265.56 | 211.85 | 219.65→ | 125 th./h. |
| | | Sundry | | | | | | −5 th./h. |
| | | | | | | | | 1,448 th./h. |

The velocity of the gas when there were no particles in the bed was $$503 \text{ m.}^3 \times \frac{700+273}{273} \times \frac{1}{3600 \text{ sec.}} \times \frac{1}{1 \text{ m.}^2} = 0.50 \text{ m./sec.}$$

The gases originating from all of the burners were entrained after the treatment of the particles at the return level and did not come any more in contact with the fluidized ore. Their sensible heat was recovered in conventional manner in a heat exchanger.

While we have furnished illustrations of the import and application of the invention, these illustrations do not amount to any limitation since equivalent means for carrying out the invention may be employed without departing from the scope thereof. We therefore do not wish to be limited otherwise than by the language of the appended claims.

What is claimed as new and desired to be secured by Letters Patent is:

1. The process of treating pulverulent material adapted to be oxidized and reduced, comprising passing the material in an even flow along a predetermined substantially horizontal path through an enclosed space forming a single fluidizing bed; introducing combustion gases into the enclosed space at a plurality of sets of inlets spaced along said path, the combustion gases emanating from the sets of inlets having from set to set differing temperatures and oxidation-reduction rates with respect to their effect on said pulverulent material; and removing the thus-treated pulverulent material at the end of said path.

2. The process of claim 1, wherein said sets of inlets include a first set in the direction of said flow and wherein the combustion gases supplied through said first set of inlets are neutral with respect to said pulverulent material and wherein the combustion gases supplied at least through one other set of inlets have oxidizing properties with respect to said pulverulent material and wherein the combustion gases supplied through at least one further set of inlets have reducing properties with respect to said pulverulent material.

3. The process of claim 2, wherein the combustion gases supplied through said first set of inlets are neutral with respect to said pulverulent material, the combustion gases supplied through the next set of inlets are oxidizing with respect to said pulverulent material, and the combustion gases supplied through the next two sets of inlets are reducing gases with respect to said pulverulent material, the latter gases having varying degrees of reducing power as between the said last two sets of inlets.

4. The process of roasting and fluidizing pulverulent material adapted to be roasted, comprising forming in a single enclosed space a fluidized substantially horizontal flow of said pulverulent material; introducing combustion gases adapted to roast said material into said fluidized flow at a series of stages during the travel of the pulverulent material in said flow, said gases introduced at said stages, respectively, having different chemical and physical characteristics with respect to said pulverulent material; and removing the treated pulverulent material at the end of said flow.

5. The process of claim 4, wherein the proportion of air in said combustion gases is sufficiently changed from stage to stage to change the characteristics with respect to said pulverulent material of the combustion gases supplied at the different stages between neutral, oxidizing and reducing.

6. The process of claim 4, wherein at the first of said series of stages in the direction of said flow a neutral gas is supplied, wherein at a second stage an oxidizing gas is supplied and wherein at a third stage a relatively slightly reducing gas is supplied and wherein at a fourth stage a relatively strongly reducing gas is supplied.

7. The process of claim 4, wherein the combustion gas at the first of said series of stages in the direction of said flow includes preheated air in stoichiometric proportions to provide for a neutral gas, and includes at the second stage an excess of preheated air so that the gas which enters said flow is an oxidizing gas, and wherein the combustion gas of the third stage has a relatively minor deficiency of air so as to provide a gas having relatively slightly reducing properties, and wherein the combustion gas of the fourth stage is formed with a relatively high deficiency of air so as to provide a strongly reducing gas, the latter deficiency of air being below that which would cause carbon black to form.

8. The process of claim 4, wherein said pulverulent material is iron ore and wherein a combustion gas is supplied at the first of said series of stages in the direction of said flow by which said ore is dehydrated beyond the degree of dehydration accomplished during a preheating thereof, and wherein a combustion gas is supplied at a second stage in the direction of said flow by which any carbonates present in the ore are substantially decomposed and any oxides are substantially converted to sequioxides, and wherein at a third stage in the direction of said flow a combustion gas is supplied by which a partial reduction of the ore to magnetite is accomplished, and wherein at a fourth stage of the flow of the ore the reduction to magnetite is completed.

9. The process of claim 4, comprising forming in a single enclosed space a fluidized substantially horizontal flow of pulverulent iron ore; moving the particles of said ore in a continuous and substantially unimpeded flow in said fluidizing bed from a starting zone to a terminal zone, introducing a combustion gas which is substantially neutral with respect to said iron ore into said fluidizing bed at a first stage in the direction of said flow so as to raise the average temperature in said fluidizing bed to about 250° C., supplying a combustion gas which is oxidizing with respect to said iron ore at a next stage of said flow so as to increase the average temperature of the fluidizing bed to about 525° C., supplying a combustion gas which is slightly reducing with respect to said iron ore at a third stage of said flow so as to increase the average temperature of said fluidizing bed to about 600° C., and supplying at a fourth stage of said flow a combustion gas which is strongly reducing with respect to said iron ore so as to raise the average temperature of the fluidizing bed to about 700° C., and removing the treated ore when it reaches said terminal zone.

References Cited

UNITED STATES PATENTS

| 3,311,466 | 3/1967 | Curlook | 75—26 |
| 2,692,050 | 10/1954 | Nelson | 75—1 |
| 2,693,409 | 11/1954 | Stephens | 75—1 |
| 2,711,368 | 6/1955 | Lewis | 75—26 |
| 3,105,756 | 10/1963 | Green | 75—1 |
| 3,189,437 | 6/1965 | Boucraut | 75—26 |
| 3,210,180 | 10/1965 | Jukkola | 75—1 |

FOREIGN PATENTS

| 164,512 | 8/1955 | Australia. |
| 1,144,101 | 4/1957 | France. |

L. DEWAYNE RUTLEDGE, *Primary Examiner.*

E. L. WEISE, *Assistant Examiner.*

U.S. Cl. X.R.

75—26